United States Patent
Cho et al.

(10) Patent No.: US 10,122,202 B2
(45) Date of Patent: Nov. 6, 2018

(54) ENERGY CHARGING APPARATUS AND METHOD

(71) Applicant: Electronics and Telecommunications Research Institute, Daejeon (KR)

(72) Inventors: In Kui Cho, Daejeon (KR); Seong Min Kim, Daejeon (KR); Jung Ick Moon, Daejeon (KR); Je Hoon Yun, Daejeon (KR); Woo Jin Byun, Daejeon (KR); Hyung Do Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 645 days.

(21) Appl. No.: 14/816,898

(22) Filed: Aug. 3, 2015

(65) Prior Publication Data
US 2016/0064946 A1    Mar. 3, 2016

(30) Foreign Application Priority Data

Aug. 26, 2014 (KR) .................... 10-2014-0111559

(51) Int. Cl.
*H02J 50/12* (2016.01)
*H02J 7/02* (2016.01)
(Continued)

(52) U.S. Cl.
CPC ............ *H02J 7/025* (2013.01); *H02J 50/12* (2016.02); *H02J 50/20* (2016.02); *H04B 5/0037* (2013.01); *H04B 5/0068* (2013.01)

(58) Field of Classification Search
CPC .......... H02J 50/20; H02J 50/12; H04B 5/0068
See application file for complete search history.

(56) References Cited

U.S. PATENT DOCUMENTS 3,728,630 A * 4/1973 Strenglein ............. G01S 13/767
                                                342/187
7,436,350 B1 * 10/2008 Maloratsky ............... G01S 7/02
                                                342/118
(Continued)

FOREIGN PATENT DOCUMENTS

KR    1020050031824 A    4/2005
KR    1020090098239 A    9/2009
(Continued)

OTHER PUBLICATIONS

K. Ota, et.al., "Bi-directional Wireless Power Transfer Technology for Wireless Sensor/Power Networks," Sep. 9-13, 2013, 2013 IEEE-APS Topical Conference on Antennas and Propagation in Wireless Communications, pp. 786-789.*

(Continued)

*Primary Examiner* — Thienvu Tran
*Assistant Examiner* — Pinping Sun
(74) *Attorney, Agent, or Firm* — William Park & Associates Ltd.

(57) ABSTRACT

Provided is an energy charging apparatus including a transponder configured to transmit and receive radio energy, and a resonator configured to transmit the radio energy transmitted from the transponder to at least one external device and transmit the radio energy received from the at least one external device to the transponder, wherein each of the transponder and the resonator is provided in a form of a single module.

15 Claims, 8 Drawing Sheets

(51) Int. Cl.
*H02J 50/20* (2016.01)
*H04B 5/00* (2006.01)

(56) References Cited

U.S. PATENT DOCUMENTS

| | | | |
|---|---|---|---|
| 8,614,526 B2 | 12/2013 | Cook et al. | |
| 8,947,041 B2* | 2/2015 | Cook | G06K 7/0008 |
| | | | 320/108 |
| 9,006,935 B2* | 4/2015 | Fukushima | H02J 5/005 |
| | | | 307/104 |
| 9,160,204 B2* | 10/2015 | Yeh | H02J 1/10 |
| 2010/0148723 A1* | 6/2010 | Cook | G06K 7/0008 |
| | | | 320/108 |
| 2012/0013295 A1* | 1/2012 | Yeh | H02J 7/025 |
| | | | 320/108 |
| 2012/0019075 A1 | 1/2012 | Cho et al. | |
| 2012/0286584 A1* | 11/2012 | Park | H01F 38/14 |
| | | | 307/104 |
| 2014/0092659 A1* | 4/2014 | Lin | H02M 7/06 |
| | | | 363/126 |
| 2014/0206384 A1 | 7/2014 | Etri | |
| 2015/0244176 A1* | 8/2015 | Van Den Brink | H02J 5/005 |
| | | | 307/104 |
| 2015/0349537 A1* | 12/2015 | Milne | H02J 50/10 |
| | | | 307/104 |
| 2015/0362333 A1* | 12/2015 | Miller | H02J 5/005 |
| | | | 340/870.02 |

FOREIGN PATENT DOCUMENTS

| | | |
|---|---|---|
| KR | 1020120010652 A | 2/2012 |
| KR | 1020140032632 A | 3/2014 |

OTHER PUBLICATIONS

Oxford Dictionary, "Definition of Radio Energy," pp. 1.*
Oxford Dictionary, "Definition of Radio Wave," pp. 1.*

* cited by examiner

ENERGY CHARGING APPARATUS AND METHOD

CROSS-REFERENCE TO RELATED APPLICATION

This application claims the priority benefit of Korean Patent Application No. 10-2014-0111559, filed on Aug. 26, 2014, in the Korean Intellectual Property Office, the disclosure of which is incorporated herein by reference.

BACKGROUND

1. Field of the Invention

Example embodiments of the present invention relate to an energy charging apparatus and method.

2. Description of the Related Art

A transmitting and receiving resonator may be provided in a small size to be used for various application devices. For this reason, the transmitting and receiving resonator may have a relatively short transmission distance and thus, be restricted in terms of location, in practice.

When a receiving resonator has a diameter D, a transmission distance of the receiving resonator may be at least radio frequency (RF) efficiency 80%. In practice, a receiving resonator may be designed and manufactured in a size greater than the diameter D. Also, the receiving resonator having the diameter D may have a transmission distance limited to the diameter D.

In general, magnetic resonance-based wireless power transmission technique may be characterized in terms of an intermediate transmission distance, for example, approximately one meter (m), and a maximum transmission distance may correspond to a diameter of a resonator. Thus, active research has been conducted to enlarge a diameter of a resonator.

In practice, when the resonator uses a magnetic resonance method through a combination of resonating modes, a transmission distance of the resonator may be restricted.

Since the diameter of the resonator may be applied to be the transmission distance of the resonator, a radio energy transmission apparatus using the resonator may perform radio energy transmission in a predetermined area in which a transmitting resonator and a transmitter are located.

SUMMARY

According to an aspect of the present invention, there is provided an energy charging apparatus including a transponder configured to transmit and receive radio energy, and a resonator configured to transmit the radio energy transmitted from the transponder to at least one external device and transmit the radio energy received from the at least one external device to the transponder, wherein each of the transponder and the resonator is provided in a form of a single module.

The transponder may include a transmitter configured to transmit the radio energy to the resonator, a receiver configured to receive the radio energy from the resonator, and a transponder switch configured to selectively connect the resonator with one of the transmitter and the receiver so as to switch the transponder to one of a transmitting module and a receiving module.

The transmitter may include a controller configured to control a control signal and a communication signal of the transmitter, a high frequency transmitter configured to transmit high frequency radio energy to the resonator based on a magnetic resonance scheme, a low frequency transmitter configured to transmit low frequency radio energy to the resonator based on a magnetic induction scheme, and a mode changing switch configured to selectively connect the transponder with one of the high frequency transmitter and the low frequency transmitter, thereby performing a switching to one of a high frequency transmission mode and a low frequency transmission mode.

The high frequency transmitter may include a signal generator configured to generate a signal for the high frequency radio energy, a power amplifier configured to amplify the signal, and an impedance matcher configured to control the amplified signal to match an output of the resonator.

The low frequency transmitter may include a signal generator configured to generate a signal for the low frequency radio energy, a power amplifier configured to amplify the signal, and an impedance matcher configured to control the amplified signal to match an output of the resonator.

The receiver may include a controller configured to control a control signal and a communication signal of the receiver, a high frequency receiver configured to receive high frequency radio energy from the resonator based on a magnetic resonance scheme, a low frequency receiver configured to receive low frequency radio energy from the resonator based on a magnetic induction scheme, and a mode changing switch configured to selectively connect the transponder with one of the high frequency receiver and the low frequency receiver, thereby performing a switching to one of a high frequency reception mode and a low frequency reception mode.

The high frequency receiver may include an impedance matcher configured to control a signal for the high frequency radio energy received from the resonator to match an output of the transponder, and a rectifier configured to rectify the signal controlled to match the output as the radio energy.

The low frequency receiver may include an impedance matcher configured to control a signal for the low frequency radio energy received from the resonator to match an output of the transponder, and a rectifier configured to rectify the signal controlled to match the output as the radio energy.

The energy charging apparatus may further include a battery configured to store the radio energy.

According to another aspect of the present invention, there is also provided an energy charging method including transmitting radio energy received from a transponder to at least one external device using a resonator, and transmitting the radio energy received from the at least one external device to the transponder using the resonator, wherein each of the transponder and the resonator is provided in a form of a single module.

The transponder may include a transmitter configured to transmit the radio energy to the resonator, a receiver configured to receive the radio energy from the resonator, and a transponder switch configured to selectively connect the resonator with one of the transmitter and the receiver so as to switch the transponder to one of a transmitting module and a receiving module.

The transmitting of the radio energy to the at least one external device may include performing a switching to one of a high frequency transmission mode and a low frequency transmission mode by using a mode changing switch included in the transmitter, transmitting high frequency radio energy to the at least one external device using the resonator based on a magnetic resonance scheme when a result of the switching corresponds to the high frequency transmission mode, and transmitting low frequency radio energy to the at least one external device using the resonator based on a magnetic induction scheme when a result of the switching corresponds to the low frequency transmission mode.

The transmitting of the high frequency radio energy may include generating a signal for the high frequency radio energy, amplifying the signal, and controlling the amplified signal to match an output of the resonator.

The transmitting of the low frequency radio energy may include generating a signal for the low frequency radio energy, amplifying the signal, and controlling the amplified signal to match an output of the resonator.

The transmitting of the radio energy to the transponder may include changing a mode to one of a high frequency transmission mode and a low frequency transmission mode by using a mode changing switch included in the receiver, transmitting high frequency radio energy to the transponder using the resonator based on a magnetic resonance scheme when the mode is changed to the high frequency transmission mode, and transmitting low frequency radio energy to the transponder using the resonator based on a magnetic induction scheme when the mode is changed to the low frequency transmission mode.

The transmitting of the high frequency radio energy may include controlling a signal for the high frequency radio energy received from the resonator to match an output of the transponder, and rectifying the controlled signal as the radio energy.

The transmitting of the low frequency radio energy may include controlling a signal for the low frequency radio energy received from the resonator to match an output of the transponder, and rectifying the controlled signal as the radio energy.

The energy charging method may further include storing the radio energy in a battery, and transmitting the stored radio energy from the battery through the transponder and the resonator to at least one external device.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
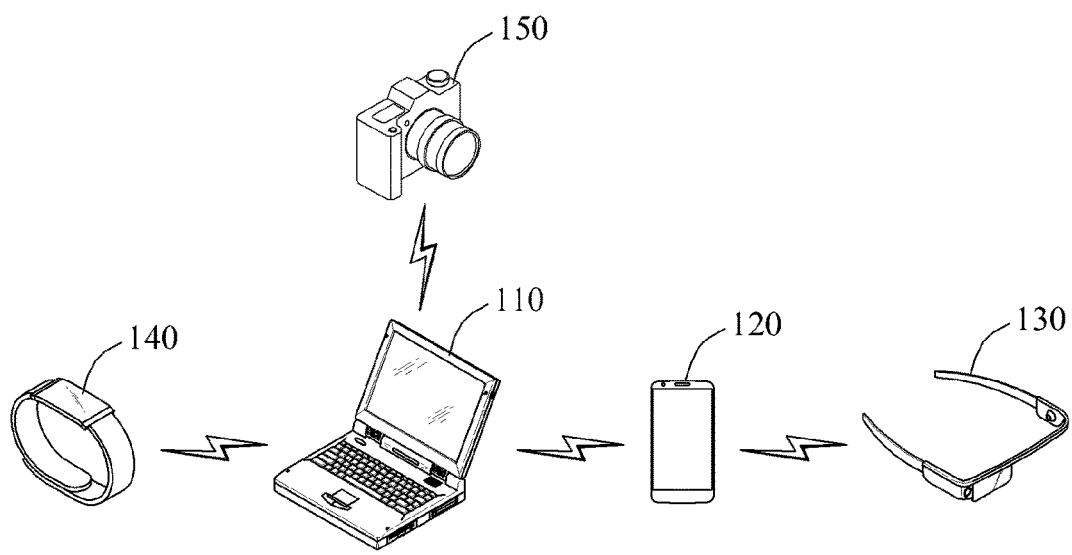
FIG. 1 is a diagram illustrating an example of charging radio energy using an energy charging apparatus according to an example embodiment of the present invention.

Hereinafter, exemplary embodiments will be described in detail with reference to the accompanying drawings, wherein like reference numerals refer to like elements throughout.

Various alterations and modifications may be made to the exemplary embodiments, some of which will be illustrated in detail in the drawings and detailed description. However, it should be understood that these embodiments are not construed as limited to the illustrated forms and include all changes, equivalents or alternatives within the idea and the technical scope of this disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, components or combinations thereof, but do not preclude the presence or addition of one or more other features, integers, steps, operations, elements, components, and/or groups thereof.

When it is determined detailed description related to a related known function or configuration they may make the purpose of the present invention unnecessarily ambiguous in describing the present invention, the detailed description will be omitted here. Also, terminologies used herein are defined to appropriately describe the exemplary embodiments of the present invention and thus may be changed depending on a user, the intent of an operator, or a custom. Accordingly, the terminologies must be defined based on the following overall description of this specification.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Like reference numerals in the drawings denote like elements, and redundant descriptions of like elements will be omitted herein. When it is determined a detailed description of a related known function or configuration they may make the purpose of the present invention unnecessarily ambiguous in describing the present invention, the detailed description will be omitted herein.

An energy charging apparatus according to an example embodiment of the present invention may be for wirelessly supplying and charging energy, and more particularly, for supplying and charging radio energy using a relatively low frequency radio wave.

To charge and transmit the radio energy, the energy charging apparatus may use an antenna coil provided in a loop structure based on a magnetic field.

To wirelessly transfer the energy, the energy charging apparatus may use a radio frequency (RF) signal. Also, to transfer the radio energy using the RF signal, the energy charging apparatus may use a circuit conversion technique, for example, a direct current (DC)/RF conversion method and an RF/DC conversion method.

Additionally, the energy charging apparatus may apply a magnetic resonance technique and a magnetic induction technique, thereby performing radio energy transmission irrespective of spatial restrictions.

FIG. 1 is a diagram illustrating an example of charging radio energy using an energy charging apparatus according to an example embodiment of the present invention.

Referring to FIG. 1, in a process of radio energy transmission, a radio energy transmission apparatus may be installed in a predetermined position to transmit radio energy, and the radio energy may also be transmitted from the installed radio energy transmission apparatus based on a pad structure.

The energy charging apparatus may be provided as an independent apparatus, and also be included in a radio energy use apparatus, for example, a laptop computer 110, a portable terminal device 120, wearable devices 130 and 140, and a camera 150, in order to transmit, receive, and charge radio energy for the radio energy use apparatus.

As an example, the laptop computer 110 including the energy charging apparatus may wirelessly transmit energy to the portable terminal device 120, the wearable device 140, and the camera 150. Also, the laptop computer 110 may be used to transfer and transmit the energy from the portable terminal device 120 to the wearable device 130.

Hereinafter, a configuration of the energy charging apparatus will be explained in detail with reference to the following descriptions.

Figure 2:
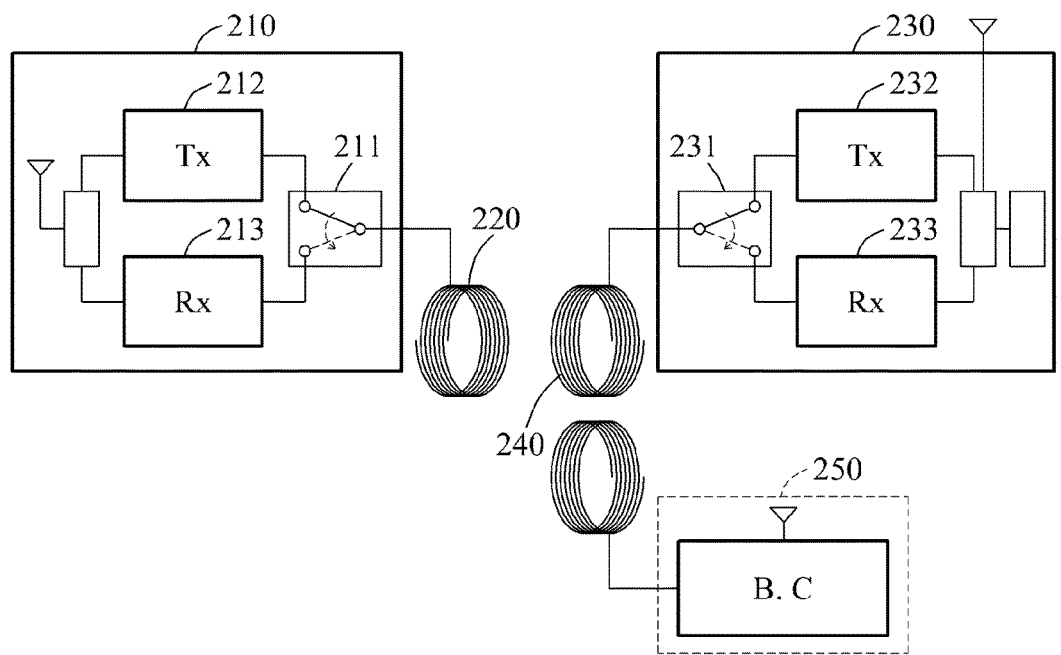
FIG. 2 is a diagram illustrating a configuration of an energy charging apparatus according to an example embodiment of the present invention.

FIG. 2 is a diagram illustrating a configuration of an energy charging apparatus according to an example embodiment of the present invention.

Referring to FIG. 2, the energy charging apparatus may include a transponder 210 and a resonator 220, each provided as a single module.

The transponder 210 may transmit and receive radio energy. The resonator 220 may transmit the radio energy transmitted from the transponder 210 to at least one external device, and transmit the radio energy received from the at least one external device to the transponder 210.

According to an aspect of the present invention, the transponder 210 may include a transponder switch 211, a transmitter 212, and a receiver 213.

The transmitter 212 may transmit the radio energy to the resonator 220, and the receiver 213 may receive the radio energy from the resonator 220.

In this example, the transponder switch 211 may selectively connect the resonator 220 with one of the transmitter 212 and the receiver 213, and switch the transponder 210 to one of a transmitting module and a receiving module.

For example, the resonator 220 may be provided as a single module to transmit and receive the radio energy, and transmit and receive the radio energy between an external energy charging apparatus and the transponder 210 provided as a single module.

Also, the transponder 210 of the energy charging apparatus may be switched to operate as one of an energy transmitting module and an energy receiving module through the transponder switch 211 in response to a select requesting signal corresponding to a selection of a user.

As an example, when the transponder 210 of the energy charging apparatus operates as the energy transmitting module, the transponder switch 211 may connect the resonator 220 and the transmitter 212 such that the resonator 220 operates as an energy transmitting resonator.

In another energy charging apparatus, to receive the radio energy transmitted from the transponder 210, a transponder switch 231 may connect a receiver 233 and a resonator 240 so as to be activated as an energy receiving module.

In the other energy charging apparatus, a transponder 230 may operate as the energy transmitting module.

As an example, when the transponder 230 of the other energy charging apparatus operates as the energy transmitting module, the transponder switch 231 may connect the resonator 240 and a transmitter 232 such that the resonator 240 operates as the energy transmitting resonator.

In the energy charging apparatus, to receive the radio energy transmitted from the transponder 230, the transponder switch 211 may connect the receiver 213 and the resonator 220 in the transponder 210 so as to be activated as the energy receiving module.

When the energy charging apparatus is adjacent to a radio energy charging apparatus, for example, an apparatus not including the transponder 210, manufactured based on a magnetic induction scheme or a magnetic resonance scheme, the transponder 210 may also provide a backward compatibility for a radio energy charging apparatus 250.

Figure 3:
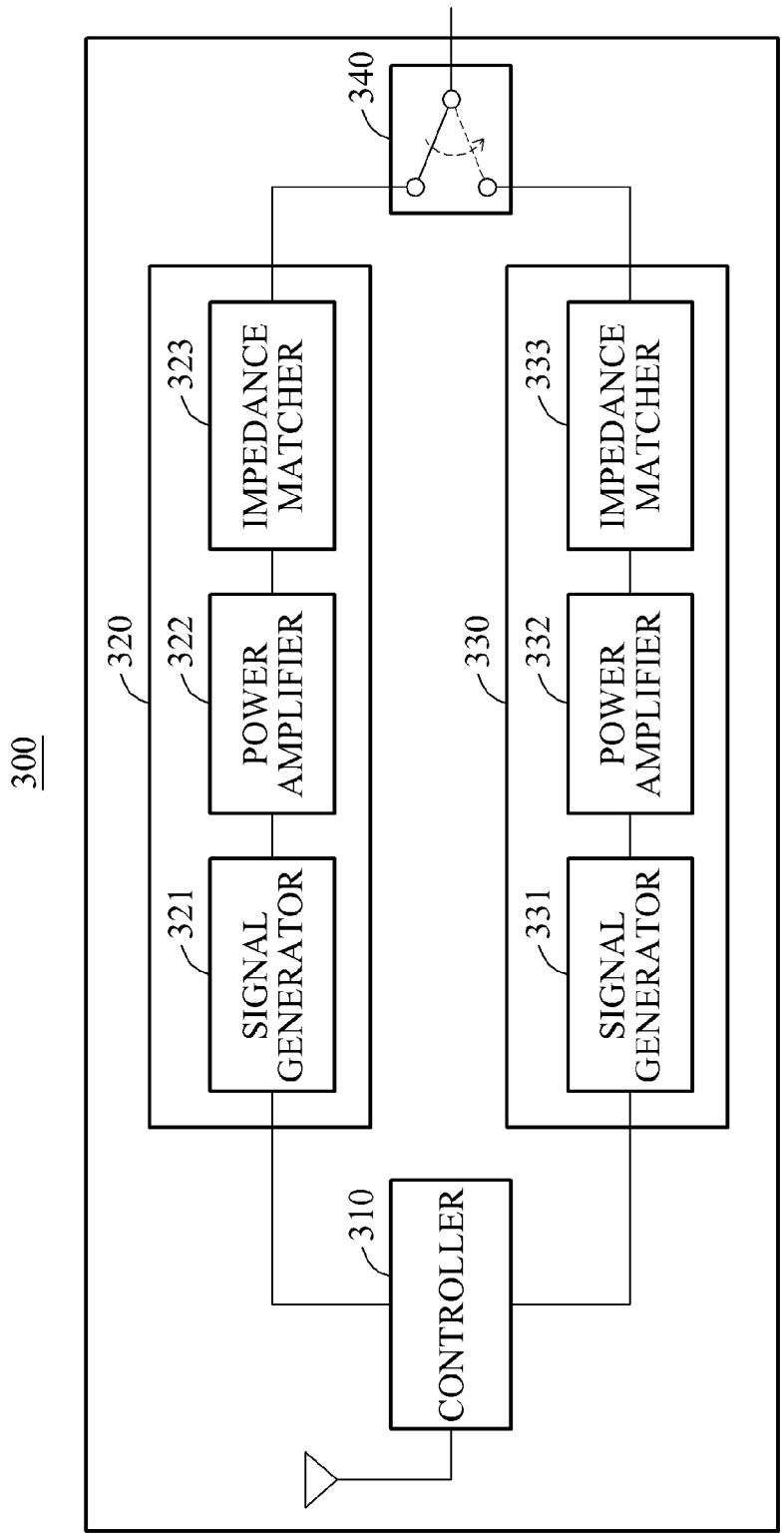
FIG. 3 is a block diagram illustrating a configuration of a transmitter according to an example embodiment of the present invention.

FIG. 3 is a block diagram illustrating a configuration of a transmitter 300 according to an example embodiment of the present invention.

Referring to FIGS. 2 and 3, the transmitter 300 may include a controller 310, a high frequency transmitter 320, a low frequency transmitter 330, and a mode changing switch 340.

The controller 310 may control a communication signal and a control signal of the transmitter 300. The controller 310 may include a communication module and a microcontroller unit (MCU) to perform a control and communication.

The high frequency transmitter 320 may transmit high frequency radio energy to the resonator 220 based on a magnetic resonance scheme. The low frequency transmitter 330 may transmit low frequency radio energy to the resonator 220 based on a magnetic induction scheme.

The high frequency transmitter 320 may operate in a high-Q transmission mode based on the magnetic resonance scheme using a higher frequency, for example, 6.78 megahertz (MHz), than a frequency transmitted by the low frequency transmitter 330.

The low frequency transmitter 330 may operate in a low-Q transmission mode based on the magnetic induction scheme using a lower frequency than a frequency transmitted by the high frequency transmitter 320. The low frequency transmitter 330 may be advantageous in terms of efficiency while having a shorter radio energy transmission distance when compared to the high frequency transmitter 320.

The mode changing switch 340 may selectively connect the transponder switch 211 with one of the high frequency transmitter 320 and the low frequency transmitter 330 so as to perform a switching to one of a high frequency transmitting mode and a low frequency transmitting mode.

Also, the high frequency transmitter 320 may include a signal generator 321, a power amplifier 322, and an impedance matcher 323.

The signal generator 321 may generate a signal for high frequency radio energy, the power amplifier 322 may amplify the signal, and the impedance matcher 323 may control the amplified signal to match an output of the resonator 220.

As an example, when an energy charging apparatus operates in the high-Q transmission mode, the signal for the high frequency radio energy may be generated by the signal generator 321, the generated signal may be amplified by the power amplifier 322, and the amplified signal may be controlled to match the output of the resonator 220 by the impedance matcher 323.

Also, the low frequency transmitter 330 may include a signal generator 331, a power amplifier 332, and an impedance matcher 333.

The signal generator 331 may generate a signal for low frequency radio energy, the power amplifier 332 may amplify the signal, and the impedance matcher 333 may control the signal to match the output of the resonator 220.

As an example, when the energy charging apparatus operates in the low-Q transmission mode, the signal for the low frequency radio energy may be generated by the signal generator 331, the generated signal may be amplified by the power amplifier 332, and the amplified signal may be controlled to match the output of the resonator 220 by the impedance matcher 333.

Also, the energy charging apparatus may use a mode switching-based amplifier, and also use an inverter-based signal generator in a low-Q mode.

Figure 4:
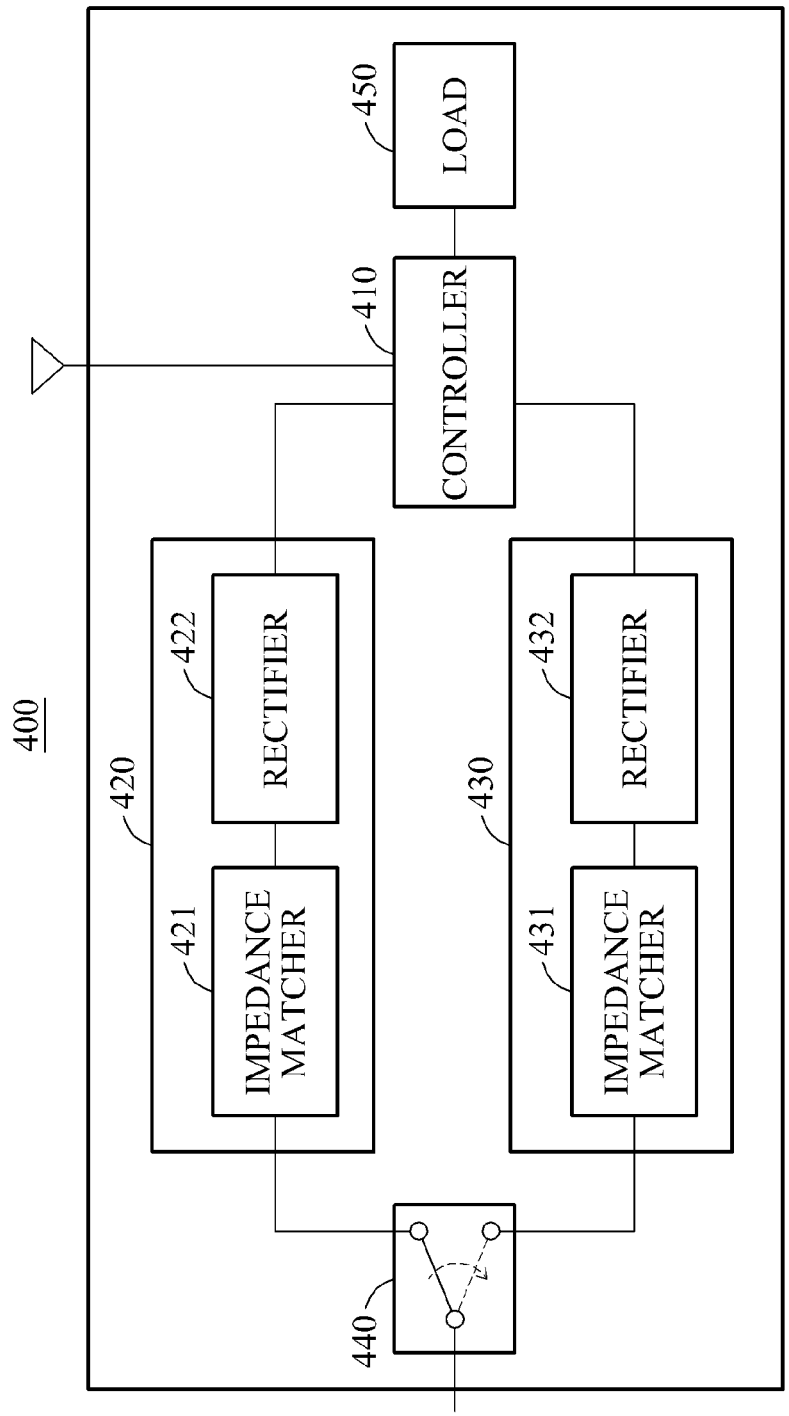
FIG. 4 is a block diagram illustrating a configuration of a receiver according to an example embodiment of the present invention.

FIG. 4 is a block diagram illustrating a configuration of a receiver 400 according to an example embodiment of the present invention.

Referring to FIGS. 2 and 4, the receiver 400 may include a controller 410, a high frequency receiver 420, a low frequency receiver 420, and a mode changing switch 440.

The controller 410 may control a communication signal and a control signal of the receiver 400. The controller 410 may include a communication module and an MCU to perform a control and communication.

The high frequency receiver 420 may receive high frequency radio energy from the resonator 220 based on a magnetic resonance scheme. The low frequency receiver 430 may receive low frequency radio energy from the resonator 220 based on a magnetic induction scheme.

The mode changing switch 440 may selectively connect the transponder switch 211 with one of the high frequency receiver 420 and the low frequency receiver 430 so as to perform a switching to one of a high frequency receiving mode and a low frequency receiving mode.

The high frequency receiver 420 may operate in a high-Q transmission mode based on the magnetic resonance scheme using a higher frequency, for example, 6.78 MHz, than a frequency received by the low frequency receiver 430.

The low frequency receiver 430 may operate in a low-Q transmission mode based on the magnetic induction scheme using a lower frequency than a frequency received by the high frequency receiver 420. The low frequency receiver 430 may be advantageous in terms of efficiency while having a shorter radio energy transmission distance when compared to the high frequency receiver 420.

The radio energy received from the resonator 220 may be classified into a low-Q mode and a high-Q mode using the mode changing switch 440, and then transmitted to the transponder 210 through a load 450.

Also, the high frequency receiver 420 may include an impedance matcher 421 and a rectifier 422.

The impedance matcher 421 may control a signal for the high frequency energy received from the resonator 220 to match an output of the transponder 210. The rectifier 422 may rectify the signal controlled to match the output, as the radio energy.

Also, low high frequency receiver 430 may include an impedance matcher 431 and a rectifier 432.

The impedance matcher 431 may control a signal for the low frequency energy received from the resonator 220 to match the output of the transponder 210. The rectifier 432 may rectify the signal controlled to match the output, as the radio energy.

As an example, the radio energy received from the resonator 220 may be received through a classification into the low-Q mode and the high-Q mode. Also, the low-Q mode and the high-Q mode may be matched by the impedance matchers 421 and 431 such that the rectifiers 422 and 432 perform RF/DC conversion on the low-Q mode and the high-Q mode.

Figure 5:
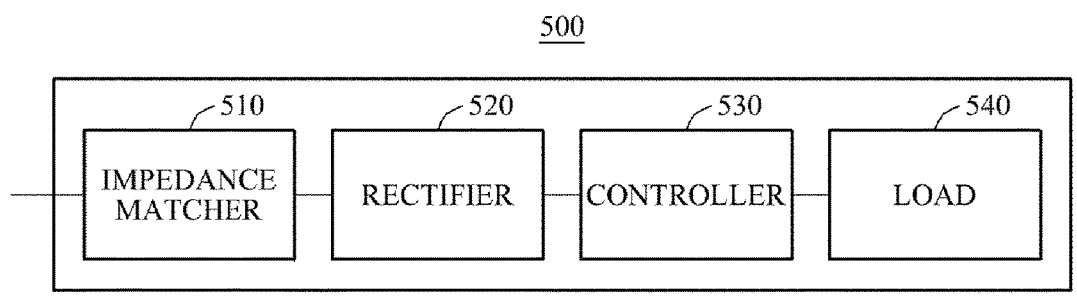
FIG. 5 is a block diagram illustrating a configuration of a radio energy charging apparatus of FIG. 2.

FIG. 5 is a block diagram illustrating a configuration of the radio energy charging apparatus 250 of FIG. 2.

Referring to FIG. 5, a radio energy charging apparatus 500 may include an impedance matcher 510, a rectifier 520, a controller 530, and a load 540. An energy charging apparatus according to an aspect of the present invention may be compatible with the radio energy charging apparatus 500.

Referring back to FIG. 2, the energy charging apparatus may transmit radio energy to the radio energy charging apparatus 250 using the transponder 210.

In the energy charging apparatus, a controller may automatically set a transmitting mode corresponding to the radio energy charging apparatus 250.

For example, the energy charging apparatus may automatically determine whether the radio energy charging apparatus 250 is based on a magnetic resonance scheme or a magnetic induction scheme. Based on a result of the determining, the energy charging apparatus may automatically change a transmitting mode to transmit the radio energy corresponding to the radio energy charging apparatus 250.

As an example, when the radio energy charging apparatus 250 corresponds to an apparatus for receiving high frequency radio energy based on the magnetic resonance scheme, the energy charging apparatus may transmit the high frequency radio energy by automatically switching the transmitting mode to a high frequency transmitting mode.

As another example, when the radio energy charging apparatus 250 corresponds to an apparatus for receiving low frequency radio energy based on the magnetic induction scheme, the energy charging apparatus may transmit the low frequency radio energy by automatically switching the transmitting mode to a low frequency transmitting mode.

Figure 6:
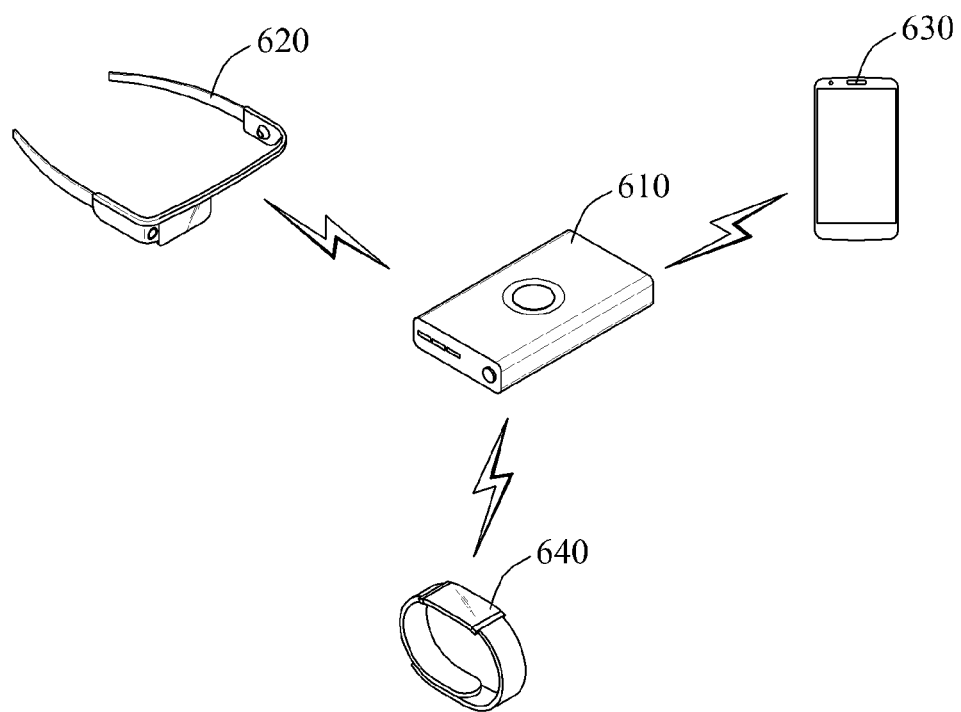
FIG. 6 is a diagram illustrating an example of transmitting radio energy to a radio energy use apparatus by using an energy charging apparatus according to an example embodiment of the present invention.

FIG. 6 is a diagram illustrating an example of transmitting radio energy to a radio energy use apparatus by using an energy charging apparatus 610 according to an example embodiment of the present invention.

Referring to FIG. 6, the energy charging apparatus 610 may be structuralized in a form of, for example, a smart energy storage and transmit radio energy to the radio energy use apparatus, for example, wearable devices 620 and 640, and a portable terminal device 630.

The energy charging apparatus 610 may include the aforementioned modules configured as shown in FIG. 2 to function as a transponder. Also, the energy charging apparatus 610 may additionally include a battery to store the radio energy.

As an example, when a total amount of additional energy for use in the wearable devices 620 and 640, and the portable terminal device 630, for example, during a business trip, is 30 watts (W), the battery may store the additional energy in the energy charging apparatus 610, thereby wirelessly charging the wearable devices 620 and 640, and the portable terminal device 630, as necessary.

Figure 7:
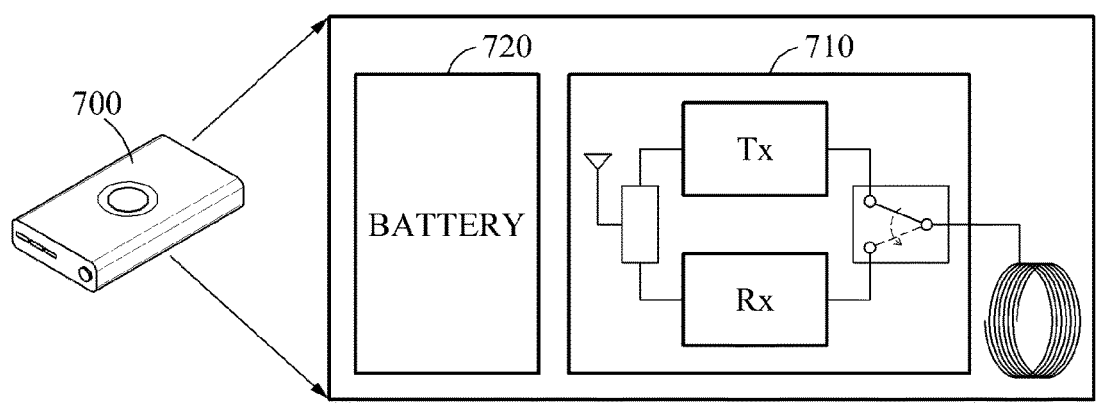
FIG. 7 is a diagram illustrating a configuration of an energy charging apparatus including a battery according to an example embodiment of the present invention.

FIG. 7 is a diagram illustrating a configuration of an energy charging apparatus 700 including a battery 720 according to an example embodiment of the present invention.

Referring to FIG. 7, the energy charging apparatus 700 may include a transponder 710 to internally transmit and receive radio energy, and include the battery 720 to store the radio energy.

Hereinafter, an energy charging method according to an example embodiment of the present invention will be explained with reference to the following descriptions.

Figure 8:
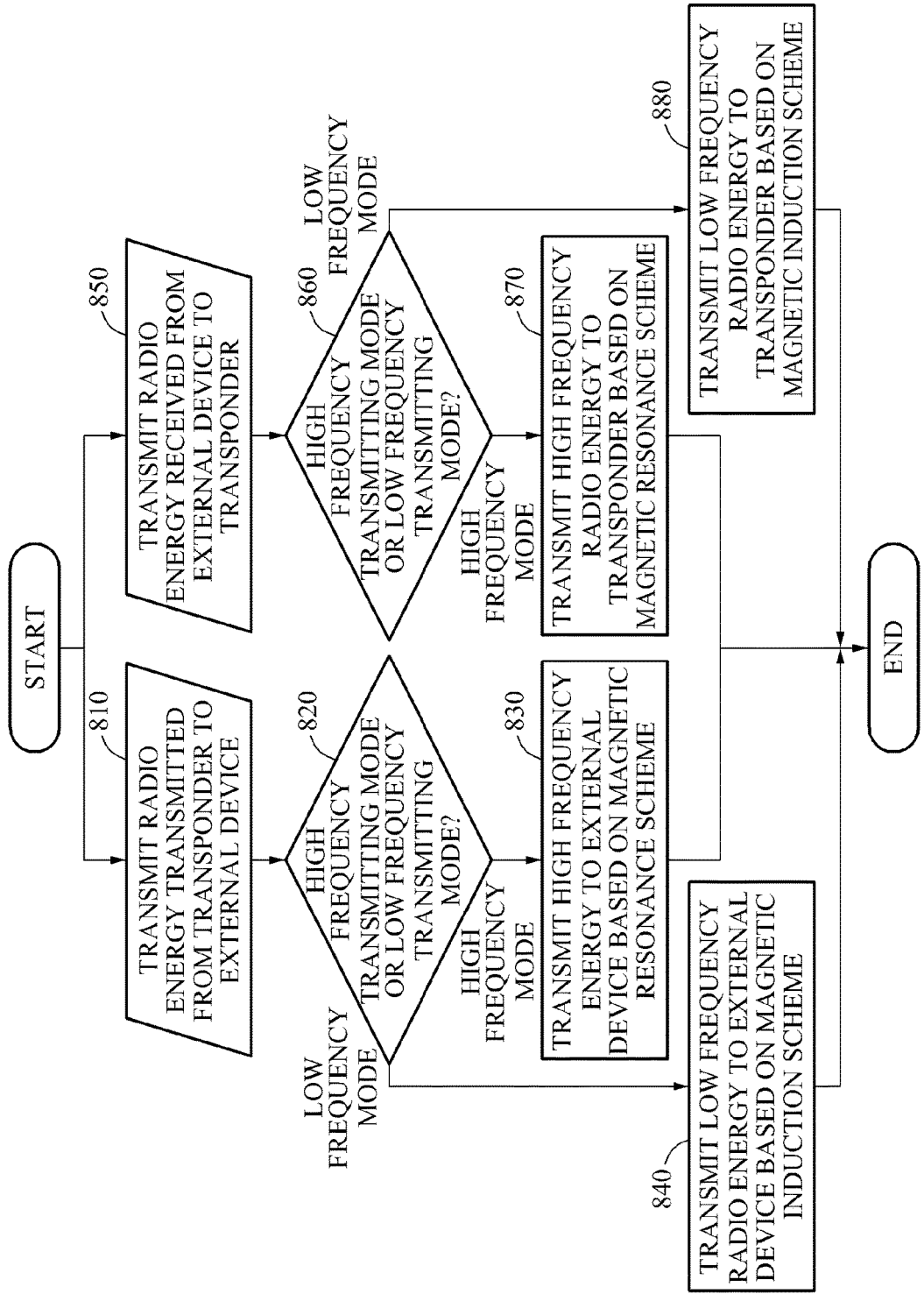
FIG. 8 is a flowchart illustrating an energy charging method according to an example embodiment of the present invention.

FIG. 8 is a flowchart illustrating an energy charging method according to an example embodiment of the present invention.

Since the energy charging method according to an example embodiment of the present invention is performed using the aforementioned energy charging apparatus, the following descriptions will be provided based on an example of the energy charging apparatus.

Referring to FIG. 8, in operation 810, the energy charging apparatus may transmit radio energy received from a transponder to at least one external device using a resonator. In operation 850, the energy charging apparatus may transmit the radio energy received from the at least one external device to the transponder using the resonator.

According to aspects of the present invention, each of the transponder and the resonator may be provided in a form of a single module.

According to aspects of the present invention, the transponder may include a transmitter to transmit the radio energy to the resonator, a receiver to receive the radio energy from the resonator, and a transponder switch to switch the transponder to one of a transmitting module and a receiving module by selectively connecting the resonator with one of the receiver and the transmitter.

In operation 820, while performing operation 810 by transmitting the radio energy to the at least one external device, the energy charging apparatus may determine whether a transmitting mode corresponds to a high frequency transmitting mode or a low frequency transmitting mode, thereby performing a switching to one of high frequency transmitting mode and the low frequency transmitting mode using a mode changing switch included in the transmitter.

In operation 830, when a result of the switching corresponds to the high frequency transmitting mode, the energy charging apparatus may transmit high frequency radio energy to the at least one external device through the resonator based on a magnetic resonance scheme.

In operation 840, when a result of the switching corresponds to the low frequency transmitting mode, the energy charging apparatus may transmit low frequency radio energy to the at least one external device based on the magnetic induction scheme.

To perform operation 830 of transmitting the high frequency radio energy, the energy charging apparatus may generate a signal for the high frequency radio energy. The generated signal may be amplified and controlled to match an output of the resonator.

To perform operation 840 of transmitting the low frequency radio energy, the energy charging apparatus may generate a signal for the low frequency radio energy. The generated signal may be amplified and controlled to match the output of the resonator.

To perform operation 850 of transmitting the radio energy to the transponder, in operation 860, the energy charging apparatus may determine whether the high frequency transmitting mode or the low frequency transmitting mode is used, thereby performing a switching to one of the high frequency transmitting mode and the low frequency transmitting mode using a mode changing switch included in the receiver.

In operation 870, when a result of the switching corresponds to the high frequency receiving mode, the energy charging apparatus may transmit high frequency radio energy to the transponder through the resonator based on the magnetic resonance scheme.

In operation 880, when a result of the switching corresponds to the low frequency receiving mode, the energy charging apparatus may transmit low frequency radio energy to the transponder through the resonator based on the magnetic induction scheme.

To perform operation 870 of receiving the high frequency radio energy, the energy charging apparatus may control a signal for the high frequency radio energy received from the resonator to match an output of the transponder, and rectify the signal controlled to match the output, as the radio energy.

To perform operation 880 of receiving the low frequency radio energy, the energy charging apparatus may control a signal for the low frequency radio energy received from the resonator to match the output of the transponder, and rectify the signal controlled to match the output, as the radio energy.

Also, the energy charging apparatus may store the radio energy in a battery, and transmit the stored radio energy from the battery through the transponder and the resonator to at least one external device.

According to an example embodiment of the present invention, it is possible to provide a radio energy charging apparatus including a transmitter and a receiver applicable to machine-to-machine communication and a wearable device.

According to another example embodiment of the present invention, it is possible to provide two transmission modes, a magnetic resonance mode and a magnetic induction mode.

According to still another example embodiment of the present invention, it is possible to provide a transmitting mode switching function and a radio energy transmitting and receiving function using one resonator.

According to yet another example embodiment of the present invention, it is possible to charge radio energy without restrictions on time and location by storing energy based on smart storage technology.

According to further another example embodiment of the present invention, it is possible to provide an energy charging method performed by an energy charging apparatus for transmitting radio energy among various devices and charging the radio energy without restrictions on time and location in lieu of a general energy charging method that may allow wireless charging to be performed only in an area including a radio energy transmitting apparatus.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An energy charging apparatus comprising:
a transponder configured to transmit and receive energy; and
a resonator configured to transmit the energy transmitted from the transponder to at least one external device and transmit the energy received from the at least one external device to the transponder,
wherein the transponder comprises:
a transmitter configured to transmit the energy to the resonator;
a receiver configured to receive the energy from the resonator; and
a transponder switch configured to selectively connect the resonator with one of the transmitter and the receiver;
wherein the transmitter comprises:
a first transmitter configured to transmit the energy with a first frequency to the resonator;
the resonator configured to transmit the energy with the first frequency to the at least one external device based on a magnetic resonance scheme;
a second transmitter configured to transmit the energy with a second frequency lower than the first frequency to the resonator;
the resonator configured to transmit the energy with the second frequency to the at least one external device based on a magnetic induction scheme; and
a mode changing switch configured to selectively connect the transponder with one of the first transmitter and the second transmitter.

2. The apparatus of claim 1, wherein the high frequency transmitter comprises:
a signal generator configured to generate a signal for the energy with the first frequency;
a power amplifier configured to amplify the signal; and
an impedance matcher configured to match an output impedance of the power amplifier with an input impedance of the resonator.

3. The apparatus of claim 1, wherein the low frequency transmitter comprises:
a signal generator configured to generate a signal for the energy with the second frequency;
a power amplifier configured to amplify the signal; and
an impedance matcher configured to match an output impedance of the power amplifier with an input impedance of the resonator.

4. The apparatus of claim 1, wherein the receiver comprises:
a controller configured to control a control signal and a communication signal of the receiver;
a first receiver configured to receive the energy with the first frequency from the resonator, wherein the resonator receives the energy with the first frequency from the at least one external device based on a magnetic resonance scheme;
a second receiver configured to receive the energy with the second frequency from the resonator, wherein the resonator receives the energy with the second frequency from the at least one external device based on a magnetic induction scheme; and
a mode changing switch configured to selectively connect the transponder with one of the first receiver and the second receiver, thereby performing a switching to one of a first frequency reception mode and a second frequency reception mode.

5. The apparatus of claim 4, wherein the first receiver comprises:
an impedance matcher configured to match an output impedance of the power amplifier with an input impedance of the resonator; and
a rectifier configured to rectify the signal controlled.

6. The apparatus of claim 4, wherein the second receiver comprises:
an impedance matcher configured to match an output impedance of the power amplifier with an input impedance of the resonator; and
a rectifier configured to rectify the signal controlled.

7. The apparatus of claim 1, further comprising:
a battery configured to store the energy.

8. An energy charging method comprising:
transmitting energy received from a transponder to at least one external device using a resonator; and
transmitting the energy received from the at least one external device to the transponder using the resonator,
wherein the transponder comprises:
a transmitter configured to transmit the energy to the resonator;
a receiver configured to receive the energy from the resonator; and
a transponder switch configured to selectively connect the resonator with one of the transmitter and the receiver,
wherein the transmitting of the energy to the at least one external device comprises:
performing a switching to one of a first transmission mode and a second transmission mode by using a mode changing switch included in the transmitter;
transmitting the energy with a first frequency to the at least one external device using the resonator based on a magnetic resonance scheme when a result of the switching corresponds to the first transmission mode; and
transmitting the energy with a second frequency lower than the first frequency to the at least one external device using the resonator based on a magnetic induction scheme when a result of the switching corresponds to the second transmission mode.

9. The method of claim 8, wherein the transmitting of the energy with the first frequency comprises:
generating a signal for the energy with the first frequency;
amplifying the signal; and
controlling the amplified signal to match an output of the resonator.

10. The method of claim 8, wherein the transmitting of the energy with the second frequency comprises:
generating a signal for the energy with the second frequency;
amplifying the signal; and
controlling the amplified signal to match an output of the resonator.

11. The method of claim 8, wherein the transmitting of the energy to the transponder comprises:
changing a mode to one of the first transmission mode and the second transmission mode by using a mode changing switch included in the receiver;
transmitting the energy with the first frequency to the transponder using the resonator, wherein the resonator receives the energy with the first frequency from the at least one external device based on the magnetic resonance scheme when the mode is changed to the first transmission mode; and
transmitting the energy with the second frequency to the transponder using the resonator, wherein the resonator receives the energy with the second frequency from the at least one external device based on the magnetic induction scheme when the mode is changed to the second transmission mode.

12. The method of claim 11, wherein the transmitting of the energy with the first frequency comprises:
controlling a signal for the energy with the first frequency received from the resonator to match an output of the transponder; and
rectifying the signal controlled.

13. The method of claim 11, wherein the transmitting of the energy with the second frequency comprises:
controlling a signal for the energy with the second frequency received from the resonator to match an output of the transponder; and
rectifying the signal controlled.

14. The method of claim 8, further comprising:
storing the energy in a battery; and
transmitting the energy stored from the battery through the transponder and the resonator to at least one external device.

15. A non-transitory computer-readable storage medium comprising a program comprising instructions to cause a computer to perform the method of claim 8.

* * * * *